United States Patent [19]

Procida et al.

[11] 4,138,462

[45] Feb. 6, 1979

[54] METHOD OF MANUFACTURING CROSS-LINKED MOULDED OBJECTS FROM CROSS-LINKABLE POLYMERIC MATERIALS

[75] Inventors: Francesco P. Procida, Lyngby; Svend S. Pedersen, Holbaek; Peter Carstensen, Copenhagen, all of Denmark

[73] Assignee: Aktieselskabet Nordiske Kabel- og Traadfabriker, Copenhagen, Denmark

[21] Appl. No.: 676,768

[22] Filed: Apr. 14, 1976

Related U.S. Application Data

[63] Continuation of Ser. No. 514,537, Oct. 15, 1974, abandoned.

[30] Foreign Application Priority Data

Oct. 15, 1973 [GB] United Kingdom ............... 47993/73

[51] Int. Cl.² .............................................. B29C 25/00
[52] U.S. Cl. .................................... 264/347; 264/209; 264/236; 427/340; 427/400
[58] Field of Search ............... 264/129, 137, 184, 236, 264/174, 176 R, 347, 340, 209; 427/340, 400

[56] References Cited

U.S. PATENT DOCUMENTS

| | | | |
|---|---|---|---|
| 2,774,110 | 12/1956 | Walters | 264/184 |
| 3,051,992 | 9/1962 | Bradley | 264/209 |
| 3,198,868 | 8/1956 | Pedretti et al. | 264/347 |
| 3,479,446 | 11/1969 | Arnaudin, Jr. et al. | 264/174 |
| 3,576,933 | 4/1971 | Bates et al. | 264/94 |
| 3,720,744 | 3/1973 | Santangelo | 264/347 |
| 3,773,885 | 11/1973 | Boone | 264/236 |
| 3,787,550 | 1/1974 | McGillvary et al. | 264/236 |
| 3,886,100 | 5/1975 | Yasuda et al. | 260/899 |

*Primary Examiner*—Jeffery R. Thurlow
*Attorney, Agent, or Firm*—Ladas, Parry, Von Gehr, Goldsmith & Deschamps

[57] ABSTRACT

The cross-linking of a moulded object based on polymeric materials is effected by heating the object in the presence of a liquid medium containing one or more peroxides under conditions that cause penetration, and the heating is continued at increasing temperatures to cause a homogeneous cross-linking.

Employable peroxides are substantially stable under the first heating step but are cleaved into free radicals during the second heating step, at least the cross-linking step being carried out with the object enclosed in a liquid of approximately the same density as the polymeric material.

4 Claims, No Drawings

METHOD OF MANUFACTURING CROSS-LINKED MOULDED OBJECTS FROM CROSS-LINKABLE POLYMERIC MATERIALS

This is a continuation of application Ser. No. 514,537, filed Oct. 15, 1974, now abandoned.

This invention relates to a method of manufacturing moulded and cross-linked objects from cross-linkable polymeric materials, such as thermoplastic polymers, copolymers, elastomers and mixtures thereof.

The term "moulded objects" in this context is to be construed in its broadest sense. Thus the invention is not limited to objects made for instance by injection, compression or transfer moulding but includes also all other methods applied in the processing of polymeric materials, such as extrusion, calendering, laminating, casting, blowing etc.

The moulded objects do not necessarily consist exclusively of polymeric material. They may, obviously, contain conventional fillers and other additives, but they may also contain reinforcing materials and could specifically be cables with a metal core coated with insulating and/or semiconductive layers of polymeric material.

Millions of tons of synthetic polymeric materials are used every year for a variety of purposes and there might seem to be little need for improving the properties of these materials. But on account of certain limitations in the physical properties of the materials they are not used for many purposes for which they would otherwise be ideally suited. Polyethylene, for instance, might need improvement in the following respects:

(1) Resistance to creep (plastic flow) at room temperature and at elevated temperatures.
(2) Resistance to solvents at elevated temperatures.
(3) Resistance to environmental stress-cracking.
(4) Resistance to brittle rupture which may occur in non-cross-linked PE tubes after prolonged pressure testing, particularly testing at elevated temperature.

The appearance of high-density polyethylene (HD-PE) is an important step on the road to solving these problems, but cross-linking, a process similar to vulcanisation of rubber, results in even greater improvements of the said properties.

In the cross-linking of cross-linkable polymeric materials it is a known art to use free radical forming agents, usually organic peroxides, to produce chemical cross-linking by thermal treatment and/or by means of accelerators, activators and/or coagents. In most known methods of manufacturing moulded cross-linked objects from cross-linkable polymeric materials the free radical forming agent has to be admixed in or incorporated in the polymer prior to moulding.

Such incorporation of free radical forming agents is generally performed in conventional mixing equipment. Where the material for instance is low density polyethylene (LD-PE) two-roller mills or Banbury mixers may be used. The mixer is heated to about 110° C. and the polyethylene, which may contain fillers, antioxidants and coagents, is added and treated for suitable period of time until the material forms a homogeneous melt. Then the free radical forming agent is added, whereafter a further mixing period of 2-5 minutes will normally be sufficient. After the addition of the free radical forming agent the temperature should as a rule be kept below 120° C. When the mixing process has been completed the material is granulated in known manner and is then ready to be supplied to extruders or plastic moulding machines in which the articles are finally moulded at temperatures low enough to prevent premature cross-linking or scorching.

The heat treatment which is then required to produce cross-linkage in the moulded objects may be performed in various ways:

In case of extruded objects the heat may in principle be supplied in continuous procedures from steam in CV (continuous vulcanisation) or CCV (catenary CV) plants, from salt baths, and from fluidised beds, or in the form of infra-red light or microwave energy. The first four of the above heat sources suffer from the drawback that the object which is to be cross-linked must be supported in some way or other to avoid deformation at the high temperatures required for the cross-linking and at which the non-cross-linked material would melt. In consequence it has not been possible to apply these methods in for instance the manufacture of profiles or tubes of cross-linked polymeric materials but only in the manufacture of cables, where the conductor is able to hold the material in position during the cross-linking procedure. The fifth method of supplying the required heat (by microwave energy) to the moulded objects is limited to polymeric materials which themselves have dielectric loss factors (tg δ) or to which a filler, for instance carbon black, has been added by compounding so as to effect high dielectric losses.

Instead of the very complex methods of heat transmission described above a direct method has been suggested in which the granulate containing the free radical forming agent is extruded through the extrusion head or through a special tool while sufficient heat to produce cross-linking in the material is supplied, but this method suffers from the disadvantages that the cross-linked material will tend to clog the extruder, the extruded object is apt to be deformed or even torn, and a smooth surface will not be obtained.

The aforesaid methods of cross-linking cross-linkable polymeric materials in which the free-radical forming agent is added before the moulding of the objects cannot, for instance, be used where the material is HD-PE, which requires so high working temperatures, both during the admixture of the free radical forming agent and during moulding, that premature cross-linking or scorching is inevitable.

Another known method which can be applied in the production of cross-linked extruded objects of HD-PE consists in principle in mixing powdered HD-PE with peroxide and various auxiliaries in a worm mixer feeding a hydraulic press which under high pressure feeds a heated tool shaped in the profile of the finished object. This method is attended with two essential drawbacks:

(1) The procedure can only be carried out in special machinery.
(2) The procedure is unfit for the production of cross-linked objects of HD-PE which contain fillers.

In the moulding of objects of cross-linked polymeric material by the known methods of compression, transfer or injection moulding it is necessary to incorporate or admix the free radical forming agent before the material is fed to the moulding machine. This results in unfavourable moulding conditions because premature cross-linking or scorching can be prevented only by low working temperature and the cross-linking process must take place in the tool in which the object is moulded. In consequence the material does not get the optimum properties and the long time which the object is held in the mould is a restricting factor in the production which makes the procedure uneconomic for most products.

To avoid these drawbacks the objects have been made from polymeric materials without the addition of cross-linking agents, and cross-linking is then caused by means of ionizing radiation. This procedure, however, is restricted to objects of limited cross-section. Besides, it requires a complex and expensive equipment and a large power consumption.

German Offenlegungsschrift No. 2,214,628 describes a method for producing foamed cross-linked polymeric objects from LD-PE which comprises suspension of polymeric particles (granules) in an aqueous emulsion containing a cross-linking agent and heating until cross-linking has been effected. Only then can the foaming and moulding step be carried out. The foaming agent may be added to the particles simultaneously with or after cross-linking. A method like this, where the granulate is cross-linked before moulding, is attended with various draw-backs. A granulated polymeric material which has been highly cross-linked cannot be moulded by conventional moulding methods such as extrusion or injection moulding because the highly cross-linked granules will not, like the original granulate, fuse under such moulding conditions and form a continuous mass but will retain the geometrical shape it had during the cross-linking, besides which the adhesion between the granules will be low. A granulated polymer material which has been moderately cross-linked cannot be moulded by conventional moulding methods because it would require extremely high pressures during processing. The degree of cross-linking normally acceptable in view of the subsequent moulding of the material is so low that for many purposes it would be entirely inadequate.

It is the aim of the present invention to provide a method of manufacturing cross-linked objects from cross-linkable polymeric material which possess all the known good properties without being attended with the above mentioned technical disadvantages and drawbacks.

This aim has been accomplished according to the invention by subjecting the object to heating in the presence of a liquid medium, such as an emulsion, suspension or solution, containing one or more peroxides under such conditions that the peroxide or peroxides penetrate into the object, on which the heating is continued at increasing temperature to obtain the desired degree of homogeneous cross-linking by using one or more peroxides which are substantially stable in the temperature range first employed but which will in a substantial degree cleave into free radicals in the temperature range employed in the final heating step, and by performing the cross-linking process with the object enclosed in a liquid whose density is preferably approximately the same as that of the polymeric material.

In the method according to the invention the objects are made in conventional manner from conventional starting materials without addition of cross-linking agents such as free radical forming agents, but the starting materials may contain fillers and/or antioxidants and/or possible cross-linking coagents. The selection of starting material is limited by only two factors: The properties desired in the finished product and the machinery available. If the processing, for instance, has not produced a non-stressed object free of internal stress, which may be a result of the employed extruder or other processing machine, it will be preferable to introduce an intermediate stress relieving step, for instance a heating of the object before it is introduced into the medium containing the cross-linking agent. If the object for instance is to be made from HD-PE it will be natural to select the type of HD-PE which will give the optimum operating conditions so that the production will proceed smoothly and faultlessly and the objects get the optimum properties. Furthermore, the method according to the invention is not limited to objects produced by extrusion and injection moulding but may be applied in connection with all methods by which objects of polymeric materials can be manufactured.

When the object has been moulded by one of the known methods one or more of the conventional cross-linking agents or free radical forming agents are introduced. They may for instance be organic peroxides such as di-tert.butylperoxide and dicumyl-peroxide or organic hydroperoxides such as tert.-butylhydroperoxide. A specifically preferred peroxide is 1,1-bis(tert.-butylperoxy)-3,3,5-trimethylcyclohexane, which causes deformation in an especially low degree during cross-linking because it produces cross-linking already at quite low temperatures (about 100° C.). The selection of cross-linking agent or agents in a given system depends inter alia on the polymeric material to be cross-linked, the method being in principle applicable to all cross-linkable polymeric materials, provided that the cross-linking agent or agents are soluble in the polymeric material.

Finally it will be possible with the method according to the invention to fulfill, singly or in combination, the following conditions which are particularly important in the manufacture of objects for specific purposes.

(1) The procedure can be controlled to produce the desired degree of cross-linking, that is a cross-linking of for instance HD-PE which is sufficiently high but not so high as to reduce the density so that the material will no longer be HD-PE.

(2) The procedure can be controlled so that the objects will show an acceptably small dimensional change.

(3) The procedure can be controlled so that the objects will not contain peroxide residue in detectable amounts.

The introduction of the cross-linking agents may be carried out for instance by immersing the objects in an aqueous dispersion of the cross-linking agent or agents in the form of an emulsion prepared either by mechanical processing, for instance in a high pressure homogenizer, or by means of emulsifiers, protective colloids or the like.

It has surprisingly been found that by a suitable heat treatment the cross-linking agent will distribute relatively homogeneously in the object so that after completion of the cross-linking process a cross-linkage with a very good depth of penetration can be ascertained.

The cross-linking itself is effected by a suitable treatment, for instance thermal, either in connection with the moulding and/or with the introduction of the cross-linking agent or the combination of cross-linking agents or in a separate process step. In the first case the heat required in the moulding step may be used wholly or partly in the subsequent cross-linking process.

A particularly preferred variant of the method according to the invention consists in that the introduction of the cross-linking agent or agents and the cross-linking process are carried out in one and the same liquid medium in a closed and pressure-proof system. The liquid medium should preferably have approximately the same density as the moulded object in order to ensure that the object will not be deformed during the heat treatment. If desired, the density of the medium may therefore be corrected by addition of one or more salts.

To obtain a specifically reliable control of the degree of cross-linking it will be expedient after the period of heating during which the cross-linking agent penetrates into the object to replace the peroxide containing medium by a medium that does not contain peroxide so that no further peroxide will penetrate during the subsequent heating period. Particularly in the manufacture of cables, it is important to prevent sticking of the coiled cross-linked product and here it will be possible to braid the cable after the penetration of the cross-linking agent but before the finishing cross-linking treatment.

It has surprisingly been found that the method according to the invention results in a cross-linking of extremely good depth of penetration and homogeneity without deformation of the objects. A standard test of the degree of cross-linking consists in determination of the insoluble part of the cross-linked polymeric material by extraction in boiling stabilised solvent. In respect of HD-PE it will has been found by extration in boiling stabilised decalin that from 80 to 100% of the material was insoluble after cross-linking by the method according to the invention.

The period of treatment, both as regards the introduction of the cross-linking agent or agents and the cross-linking process itself, depends inter alia on the course of the treating temperature, the employed polymeric material or materials, the wall thickness, the nature of the cross-linking agent or agents, and the desired degree of cross-linking, but it usually varies from a few hours up to 24 hours.

The same considerations will apply to the pressure of treatment, in that the process can be carried out both at atmospheric pressure and at a higher or lower positive pressure. In general the parameters temperature, treating time and pressure may be varied within very wide limits. Decisive in this respect are the desired properties in the end product, for instance degree of cross-linking, dimensional stability and permissible content of peroxide residue. These properties, as well as the course of the process, are determined also by the selected peroxide, whose properties in turn define the ranges of temperature, time and pressure.

It may be mentioned especially that the formation of blisters caused for instance by volatile components from possible fillers or by disintegration products from the cross-linking agents and known for instance from the above described continuous vulcanisation, has been avoided in the method according to the invention. This has been accomplished by a suitable selection of the above mentioned parameters in that for example a sufficiently long time treatment will enable the disintegration products to diffuse while the said formation of blisters may be suppressed wholly or partly, for instance by an increase of the applied pressure.

In the method according to the invention it will also, as mentioned above, be possible to include coagents. They may either be introduced in the moulding step or they may be admixed in the employed peroxide containing liquid medium. Applicable coagents comprise polyunsaturated organic compounds such as triallylcyanurate, sorbic acid and ethyleneglycol dimethacrylate.

The cross-linking of the object after the introduction of the cross-linking agent or agents may, instead of by heat treatment, be effected by treating the object at reduced temperature with activators or accelerators for the cross-linking agents.

The method according to the invention will be illustrated below by way of examples.

EXAMPLE 1

515 grs of polyethylene ("Hostalen ® GM 5010", melt index MFI 0.3 gr/10 min., density 0.955 gr/ccm, containing from 2.5 to 3.0% of carbon black) in the form of two tubes having an external diameter of 17.0 mm and a wall thickness of 3.0 mm and a slab having the dimensions 600 × 65 × 11.3 mm were placed in a tubular autoclave having a diameter of 80 mm and a length of 680 mm.

An emulsion was prepared from:
20 grs of di-tert.-butylperoxide ("Trigonox B", Noury van der Lande),
0.1 gr of polyvinylalcohol ("Elvanol 7260", du Pont),
2.6 grs of oleic acid,
0.3 gr of NaOH,
20 grs of anhydrous $Na_2SO_3$.

The autoclave was filled with distilled water and the above emulsion and the liquid circulated in the autoclave by means of a piston pump acting simultaneously as homogenizer.

Over a period of 2.5 hours the liquid temperature was raised to 120° C. and maintained at that level for 4 hours, on which it was raised to 133° C. and maintained at that level for 14 hours.

After the cross-linking thus produced the external diameter of the tubes had increased from 17.0 to 17.2 mm while the density had fallen from 0.955 to 0.925 gr/ccm.

By decalin extraction the tubes showed a gel content of 97%. On removal from the autoclave the tubes showed no tendency to stick In the 11.3 mm slab a gel percentage of 92 was ascertained in a depth of up to 1 mm from the surface. 3-4 mm from the surface the gel content of the material was found to be 80%.

EXAMPLE 2

In the tubular autoclave used in Example 1 was placed 495 grs of polyethylene consisting of 7 polyethylene tubes ("Hostalen ® GM 5010", MFI 0.3 gr/10 min., density 0.955 gr/ccm, containing 2.5-3.0% of carbon black), length 60-65 cm, external diameter 17.0 mm and wall thickness 2.8 mm.

An emulsion of the same composition as in Example 1 was prepared.

The autoclave was filled with distilled water and the above medium. Then the liquid was circulated in the autoclave by means of a gear wheel pump at a rate of 6 ltr/min.

Over a period of 2 hours the liquid temperature was raised to 115° C. and maintained at that level for three hours, on which it was raised to 158° C. over a period of 5 hours and maintained at that level for a further 7 hours.

After the cross-linking thus produced the external diameter of the tubes had increased from 17.0 to 17.1 mm while the density had fallen from 0.955 to 0.918 gr/ccm.

By decalin extraction the tubes showed a gel percentage of 99–100.

On removal from the autoclave the tubes showed no tendency to stick.

EXAMPLE 3

In the tubular autoclave used in Example 1 was placed 475 grs of polyethylene consisting of a pressed polyethylene slab, 100 × 70 × 12.5 mm, without content of filler ("Hostalen ® GM 6050", MFI 0.3 gr/10 min, density 0.946 gr/ccm) and an extruded polyethylene slab, 600 × 60 × 11.3 mm ("Hostalen ® GM 5010").

An emulsion of the same composition as specified in Example 1 was prepared.

When the autoclave had been filled with the said emulsion and distilled water the polyethylene was cross-linked under the same conditions as in Example 2.

After the cross-linking thus produced a gel percentage of 77.4 was ascertained in the Polyethylene "GM 6050" slab at a depth of approximately 6 mm from the surface.

In the polyethylene "GM 5010" slab a gel percentage of 99.7 at a depth of maximum 2.5 mm from the surface was ascertained. At a depth of 5–6 mm from the surface the gel percentage of the material was found to be 86.2.

EXAMPLE 4

Cross-linking of an unplasticised PVC profile having a wall thickness of approximately 1.5 mm.

An emulsion of the same composition as in Example 1 was prepared and applied in an amount corresponding to 10% by weight of peroxide calculated on the weight of the PVC object. The emulsion was filled into a 2 ltr. stainless steel autoclave together with the PVC object. The temperature in the autoclave was raised slowly to 125° C. (over a period of about 2 hours) and maintained at that level for 48 hours. After this treatment the following changes were observed in the PVC object:
  (a) By Soxhlet extraction with tetrahydrofurane an insoluble residue of 25% was found (as compared with 0% in an untreated reference sample).
  (b) By a hot deformation test (EMKO (10)5 102/71 sect. 15,a) but lasting one hour at 95° C., a depression of 2.25 mm was ascertained (as compared with 4.0 mm in an untreated reference sample).
  (c) A mechanical measuring in an Instron tensile testing apparatus showed a Young module of 70 bar/% (as compared with 140 bar/% in an untreated reference sample

EXAMPLE 5

In the tubular autoclave used in Example 1 was placed 569 grs of polyethylene consisting of 7 polyethylene tubes of 17 mm × 2.5 mm (diameter × wall thickness). The tubes were manufactured from "Hostalen ® GM 5010" or "Lupolen ® 5261 Z" (density 0.950, melt index (DIN 53735) at 21.6 kg load: 1.7–2.3). In some of the tubes the below specified coagents had been used and two of the tubes had been stress-relieved. An emulsion was prepared from:
  10 grs of 1,1-bis(t-butylperoxy)-3,3,5-trimethylcyclohexane,
  30 grs of 2,5-dimethyl-2,5-di(t-butylperoxy)hexane,
  32.6 grs of oleic acid,
  4.7 grs of NaOH.
  1.3 grs of polyvinylalcohol,
  50 grs of $Na_2SO_3$,
  5 ltr of deaerated tap water.

The emulsion was filled into the autoclave and circulated by means of a centrifugal pump at 82° C. for 7 hours, whereafter the emulsion was replaced by deaerated water containing 50 gr of $Na_2SO_3$.

Over a period of 12 hours the temperature was raised from 105° to 150° C. at a rate of 3–5° C. per hour, the rise being lowest at the lower temperatures.

After the cross-linking the following density, gel percentage and shrinkage were measured in the lengthwise direction of the tubes.

| Material | Gel % | Density | Shrinkage % |
|---|---|---|---|
| Hostalen GM 5010 | 76 | 0.947 | 3.9 |
| Hostalen GM 5010 + 2% of ethylene glycol dimethacrylate | 87 | 0.946 | 4.0 |
| Hostalen GM 5010 + 2% of sorbic acid | 83 | 0.946 | 4.0 |
| Hostalen GM 5010 + 2% of triallylcyanurate | 85 | 0.945 | 2.8 |
| Hostalen GM 5010, heat treated to remove internal stress | 80 | 0.946 | 2.3 |
| Lupolen 5261 Z | 99 | 0.931 | 4.2 |
| Lupolen 5261 Z heat treated | 99 | 0.931 | 2.7 |

EXAMPLE 6

In the tubular autoclave used in Example 1 was placed 420 grs of polyethylene consisting of 8 polyethylene tubes, 17 mm × 2.5 mm. The tubes were made partly from Lupolen ® 5261 Z and partly from Rigidex ® H 02054P (density 0.954, melt index (DIN 53735) at 21.6 kg load: 2.0).

An emulsion was prepared as described in Example 5, but with 20 grs of 1,1-bis(t-butylperoxy)-3,3,5-trimethylcyclohexane as the only peroxide component.

The emulsion was filled into the autoclave and circulated by means of a centrifugal pump.

The temperature was maintained at 94° C. for 6.5 hours, whereafter it was raised over a period of 9 hours to 150° C., the rise being limited to 2–4° C. per hour until 110° C.

The temperature was maintained at 150° C. for 2 hours.

After cross-linking the following values were ascertained:

| Material | Gel % | Density | Shrinkage % |
|---|---|---|---|
| Lupolen 5261 Z | 97 | 0.930 | 3.1 |
| Rigidex H02054P | 82 | 0.933 | 5.8 |

What we claim is:
1. A method for cross-linking a shaped article which is in the form of a cable, tube, slab or profile made of high density polyethylene whereby the article is not deformed during the process which comprises
  (a) immersing said article in a heated aqueous liquid which contains a peroxide cross-linking agent whereby said cross-linking agent diffuses into the article wherein the time of immersion is sufficient to allow the desired depth of a penetration and the temperature is high enough to effect the desired rate of diffusion and low enough so that cross-linking can be kept low or eliminated.
  (b) subsequently heating said article at a temperature at which the cross-linking will occur in an aqueous liquid whose density at that temperature is approximately the same as that of the article.

2. A method according to claim 1 wherein the liquid of the cross-linking step is the same as the peroxide containing liquid.

3. A method according to claim 1 wherein the liquid containing the peroxide is replaced after the desired depth of diffusion has been reached for the cross-linking step, by an aqueous liquid which contains no peroxide.

4. A method according to claim 1, wherein said shaped article contains substantially no cross-linking agent prior to said immersing said article.

* * * * *